United States Patent [19]
Huang et al.

[11] Patent Number: 5,997,794
[45] Date of Patent: Dec. 7, 1999

[54] METHOD OF MAKING MATRIX FOR CARBONATE FUEL CELLS

[75] Inventors: Chao M. Huang, Danbury; Joel D. Doyon, Bantam; Chao-Yi Yuh, New Milford, all of Conn.

[73] Assignee: Energy Research Corporation, Danbury, Conn.

[21] Appl. No.: 09/135,811

[22] Filed: Aug. 18, 1998

[51] Int. Cl.$^6$ .................................................. C04B 35/44
[52] U.S. Cl. ...................... 264/299; 264/109; 264/166; 264/650; 264/670; 501/1
[58] Field of Search .................... 264/299, 650, 264/109, 670, 166; 501/1

[56] References Cited

U.S. PATENT DOCUMENTS

| | | | |
|---|---|---|---|
| 2,486,410 | 11/1949 | Howatt | 264/650 |
| 3,238,049 | 3/1966 | Somers | 264/669 |
| 4,353,958 | 10/1982 | Kita | 428/329 |
| 4,478,776 | 10/1984 | Maricle | 264/83 |
| 5,399,443 | 3/1995 | Ong et al. | 429/33 |
| 5,432,138 | 7/1995 | Hofmann | 501/153 |
| 5,827,495 | 10/1998 | Tomimatsu | 423/600 |
| 5,879,078 | 3/1999 | Tsuzuki | 366/137 |

*Primary Examiner*—James Derrington
*Attorney, Agent, or Firm*—Robin, Blecker & Daley

[57] ABSTRACT

A method of forming an electrolyte matrix for a carbonate fuel cell. An $\alpha$-LiAlO$_2$ ceramic is mixed in an aqueous solvent having a citric acid dispersant and deflocculated using a high energy attrition milling. The deflocculated mixture is added to an alcohol/glycerol aqueous binder system to form a slurry which is degassed and then tape cast to form the matrix.

43 Claims, 8 Drawing Sheets

FIG. 2

| ITEM | DENSITY (g/cc) | WEIGHT (g) | Wt. % | VOL. % IN DRIED TAPE |
|---|---|---|---|---|
| α-LiAlO₂ | 3.65 | 285 | 26 | 38.5 |
| Al₂O₃ DISKETTE | 3.96 | 150 | 13.7 | 18.7 |
| WATER | 1 | 550 | 50.2 | 0 |
| CITRIC ACID | 1.48 | 12 | 1.1 | 5 |
| PVA-203 | 1.28 | 56 | 5.1 | 21.3 |
| PVA-523 | 1.28 | 0 | 0 | 0 |
| GLYCEROL | 1.26 | 41 | 3.7 | 16 |
| DF-75 DEFOAMER | 0.98 | 1.2 | 0.11 | 0.3 |
| SURFYNOL 420 SURFACTANT | 0.98 | 1 | 0.1 | 0.2 |

| ITEM | DENSITY (g/cc) | WEIGHT (g) | Wt. % | VOL. % IN DRIED TAPE |
|---|---|---|---|---|
| $\alpha$-LiAlO$_2$ | 3.65 | 285 | 31 | 37 |
| Al$_2$O$_3$ DISKETTE | 3.96 | 150 | 16.5 | 18 |
| WATER | — | 350 | 38.6 | 0 |
| CITRIC ACID | 1.48 | 12 | 1.3 | 3.8 |
| PVA-203 | 1.28 | 26 | 2.9 | 9.6 |
| PVA-523 | 1.28 | 30 | 3.3 | 11.1 |
| GLYCEROL | 1.26 | 52 | 5.7 | 19.5 |
| DF-75 DEFOAMER | 0.98 | 1.2 | 0.13 | 0.5 |
| SURFYNOL 420 SURFACTANT | 0.98 | 1 | 0.1 | 0.48 |

FIG. 3

| CURRENT DENSITY (mA/cm2) | OPERATION CONDITIONS (Utilization) | OPEN CIRCUIT VOLTAGE (OCV, mV) | GAS CROSS-OVER (%) | IR-FREE VOLTAGE (mV) | RESISTANCE (mΩ) |
|---|---|---|---|---|---|
| 160 | 78.6% FUEL 72.4% OXIDANT | 1058 | 0 | 783 | 1.7 |

FIG. 8

METHOD OF MAKING MATRIX FOR CARBONATE FUEL CELLS

BACKGROUND OF THE INVENTION

This invention relates to carbonate fuel cells and, in particular, to matrices, and methods of making same, for use in such cells.

Carbonate fuel cells offer a highly efficient and environmentally clean option for power generation. A key component in carbonate fuel cells is a porous (~40–50 vol. % porosity), thin (~0.5–1 mm) ceramic matrix filed with a carbonate electrolyte (for example, Li/K carbonate eutectic). The functions performed by the ceramic/electrolyte matrix in the carbonate fuel cell include: (1) electronic isolation of the anode and cathode compartments, (2) ionic conduction between the anode and cathode electrodes, and (3) separation of the anode and cathode compartment gases.

The ceramic materials of the matrix provide the electronic isolation, while the carbonate electrolyte present within the pores of the ceramic matrix supports ionic conduction. The matrix pore sizes are required to be in the submicron range to achieve desired capillary force for retaining electrolyte and differential bubble pressure for preventing the anode and cathode compartment gases from crossing over. Large-size pores are avoided to adequately maintain the gas separation.

During the last decade, gamma lithium aluminate ($\gamma$-LiAlO$_2$) has been mainly used as the ceramic matrix support material in the carbonate fuel cell due to its chemical stability in the molten carbonate environment. Matrices made from ultra-fine $\gamma$-LiAlO$_2$ powder (~0.1–0.24 $\mu$m) using a tape casting technique (see, e.g., German Patent DE 3235240; U.S. Pat. No. 4,353,958; and U.S. Pat. No. 4,478,776) are able to provide a desired pore structure for retaining electrolyte and for realizing gas separation. The tape casting process involves dispersing the ceramic powder in a solvent, to which organic binders and a plasticizer are added to form a castable ceramic slurry. The slurry is subsequently casted into thin-sheet layers in a chambered tape casting machine. In this process, the solvents are evaporated by applying air and/or heating.

Organic solvents are primarily used as the tape casting vehicle in the ceramic matrix formation. However, the use of organic solvents involves a number of disadvantages. Firstly, working with organic solvents requires that appropriate protective measures be taken in order to avoid health hazards and the risk of explosion. Moreover, the organic solvents must be prevented from escaping into the atmosphere. As a result, the equipment requirements are severe. This drives up equipment costs.

A second disadvantage of using organic solvents in the tape casting process is that the ceramic slurry tends to form a surface skin due to the very fast evaporation of the organic solvents. Such skinning significantly retards the as-cast matrix tape drying rate and may trap any unreleased air bubbles in the tape. Bubbles in the matrix tape result in undesirably large pores in the matrix. These large pores can result in detrimental reactant gas crossover, thereby lowering cell performance and shortening cell life.

Despite the aforesaid disadvantages of organic solvents, they offer a more practical solvent than aqueous solvents because of the hydroscopic nature of the $\gamma$-LiAlO$_2$. Water can hydrolyze the $\gamma$-LiAlO$_2$ into lithium hydroxide and aluminum hydroxide. Although lithium aluminate may form again upon drying, the formed phase is the alpha or beta lithium aluminate phase, which phases have not been used to any great degree in matrix formation.

Besides the phase transformation, the formation of widespread aggregates/agglomerates due to the hydrolysis of $\gamma$-LiAlO$_2$ is also an obstacle to using an aqueous or water solvent in tape casting of $\gamma$-LiAlO$_2$ matrices. These widespread aggregates caused by the hydrogen-bonding of the hydrolyzed particles are very difficult to deaggregate when using only the mechanical forces produced by standard milling. As a result, a slurry with excessively high viscosity is created so as to prevent practical ceramic processing.

While few practical efforts have been made to use water as a solvent in the casting of $\gamma$-LiAlO$_2$ matrices, a tape casting method which uses such an aqueous solvent is described in a recently issued U.S. Pat. No. 5,432,138. In this method, a hydroxyl group polymer, such as polyvinyl alcohol (PVA), is used to bond the water molecules so as to prevent the hydrolysis of the $\gamma$-LiAlO$_2$. Using this method, a flexible tape can be made from a slurry of gamma lithium powder directly stirred in a PVA/water mixture.

Although this method appears to prevent the hydrolysis of $\gamma$-LiAlO$_2$ in the aqueous base processing, several concerns exist as to use of a matrix made with this method in carbonate fuel cell applications. A major concern is that such a matrix may not have a pore size distribution (which plays a key role in electrolyte storage and gas separation) adequate for carbonate fuel cells. It is believed that if the process of the '138 patent is followed, the high surface area $\gamma$-LiAlO$_2$ tends to agglomerate easily so as to form uncontrolled lumps and clusters. These agglomerates or clusters will contain nearly random-sized pores, and the largest of these pores can seriously affect the sealing efficiency of the final matrix.

Alpha lithium aluminate ($\alpha$-LiAlO$_2$) has been known to be more stable than $\gamma$-LiAlO$_2$ in the molten carbonate environment, and efforts toward using this material in forming a carbonate fuel cell matrix have recently increased. Tape casting with an organic solvent is also the technique proposed for making $\alpha$-LiAlO$_2$ matrices with a desirable pore size distribution. However, tape casting of such a material using an aqueous or water solvent has not as yet been carried out.

A difficulty in using a water solvent in the tape casting of $\alpha$-LiAlO$_2$ is the occurrence of hydration during the deflocculation step. Although the hydration product is eventually converted back into $\alpha$-LiAlO$_2$ upon drying, the tendency of high viscosity or gelation due to the hydrogen bond (H-bond) retards the deflocculation process. The extent of the gelation is strongly affected by the powder surface area, solid loading level, deflocculation time, and the dispersant used. The more the powder, i.e., the higher the solids loading, the higher the viscosity. Also, the higher the total powder surface area, the easier the gelation. Experimental data indicates that if a high surface area $\alpha$-LiAlO$_2$ ($\geq$20 m$^2$/g) is stirred long enough ($\geq$0.5 hour) in water, a gel or "cake" will form.

It is therefore an object of the present invention to provide a method for making a ceramic matrix for a carbonate fuel cell which overcomes the above-mentioned disadvantages of prior methods.

It is a further object of the present invention to provide a method for making a ceramic matrix having a desired pore size distribution and in which $\alpha$-LiAlO$_2$ and an aqueous solvent are used.

SUMMARY OF THE INVENTION

In accordance with the principles of the present invention, the above and other objectives are realized in a method for making a ceramic matrix in which a deflocculation process is carried out using a high-energy attrition milling to mill a ceramic material contained in an aqueous solvent. With this type of milling, the deflocculation time is sufficiently limited, thereby retarding hydration effects. A dispersant, preferably, citric acid, is also added to the aqueous solvent to retard agglomeration of the ceramic particles, thereby enhancing the deflocculation.

In further accord with the invention, the deflocculation process is followed by a slurry forming process in which the deflocculated mixture is added to and further mixed with a binder system comprised of a hydroxyl group polymer and a plasticizer. A preferable polymer is PVA and a preferable plasticizer is glycerol. The formed slurry is then degassed, tape cast and dried to complete the matrix formation.

A preferable ceramic material is $\alpha$-$LiAlO_2$.

BRIEF DESCRIPTION OF THE DRAWINGS

The above and other features and aspects of the present invention will become more apparent upon reading the following detailed description in conjunction with the accompanying drawings, in which:

FIGS. 2 and 3 show tables giving the constituent makeup of ceramic matrices made with the method of FIG. 1;

FIG. 8 shows the test data of a fuel cell utilizing a ceramic matrix made with the method of FIG. 1.

DESCRIPTION OF THE INVENTION

Figure 1:
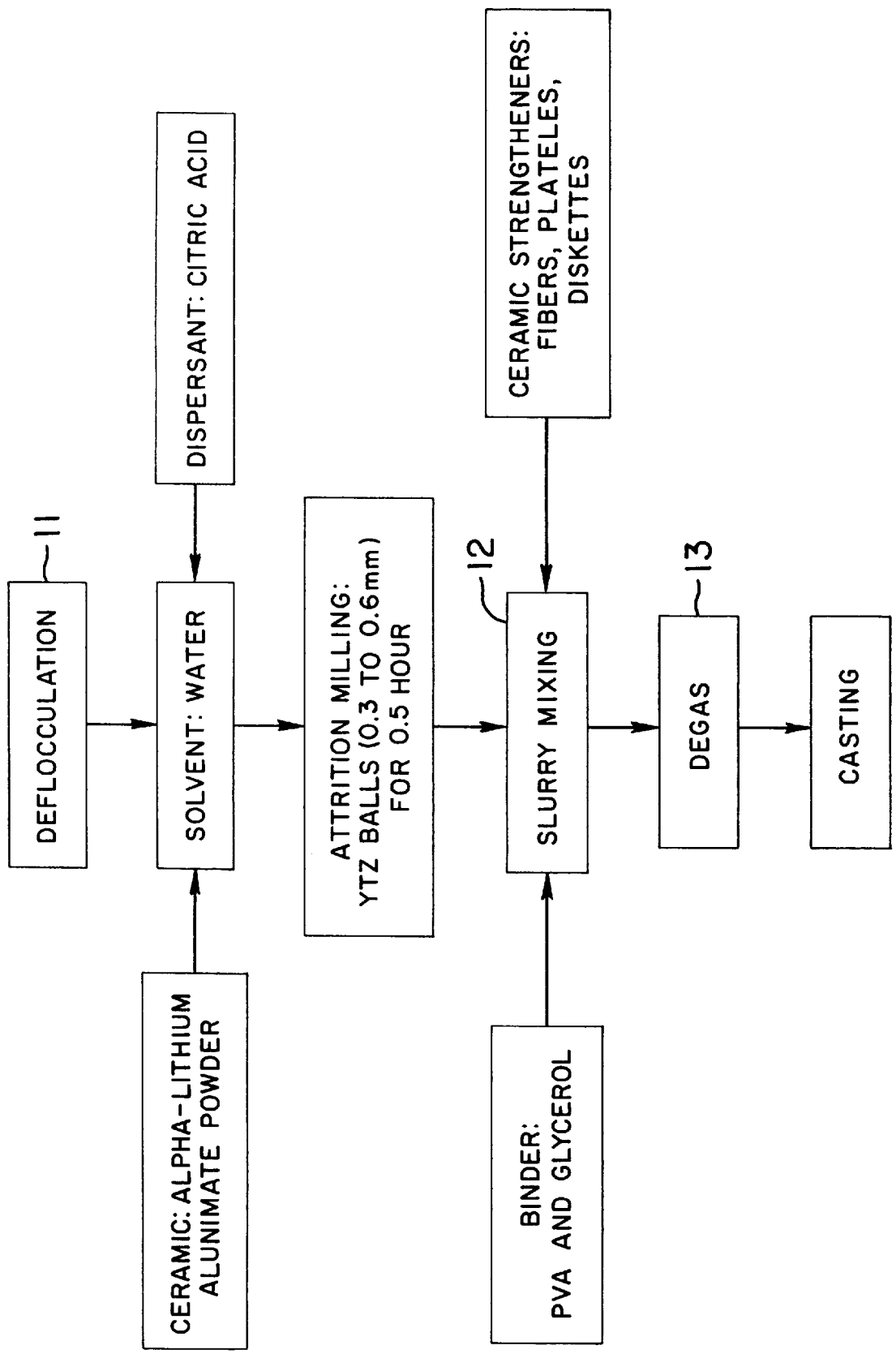
FIG. 1 shows a flow diagram of a method for forming a ceramic matrix for carbonate electrolyte in accordance with the principles of the present invention.

FIG. 1 shows the steps of a method for making a ceramic matrix or tape with a desired pore size distribution using an aqueous solvent in accordance with the principles of the present invention. Preferably, the ceramic material used is $\alpha$-$LiAlO_2$ and, with the method of the invention, a stable suspension of the $\alpha$-$LiAlO_2$ in water is obtained. This suspension is then used in preparing an aqueous based tape casting slurry having a high solid loading (~60 vol. %) of the ceramic without the occurrence of gelation.

As shown in FIG. 1, the method of the invention is initiated with a deflocculation process 11. This process includes dispersing of an $\alpha$-$LiAlO_2$ powder in an aqueous solvent to which is also supplied a dispersant. The dispersed ceramic powder in the aqueous solvent is then subjected to a high-energy attrition milling.

The attrition milling allows complete deflocculation of the $\alpha$-$LiAlO_2$ in a very short time (~15 min to 0.5 hour), and thus reduces the extent of any $\alpha$-$LiAlO_2$ hydration. By high-energy attrition milling is meant milling using very small YTZ (yttrium toughened zirconia) grinding balls (~0.3 to 0.6 mm diameter) and a high milling speed (~1000 to 1500 RPM), or equivalent structure and/or parameters, with a high charge level of grinding or solid medium (~40 to 60 vol. %).

The preferred dispersant used in the aqueous solvent is citric acid. The effect of citric acid on the $\alpha$-$LiAlO_2$ deflocculation is believed to be attributable to an electrical double layer repulsive force which separates particles far apart enough to prevent contact and agglomeration. This repulsive force is generated by creating a surface charge (positive) on the ceramic powder particles through the adsorption of citric acid. The extent of surface charging is determined by the amount of citric acid adsorbed on the particles.

Once the high-energy attrition milling is completed, the deflocculation step is finished and the process moves to a slurry formation process or step 12. In this step, the deflocculated mixture is added to an aqueous binder system comprised of a hydroxyl group polymer and a plasticizer. Preferably, an aqueous binder system of polyvinyl alcohol (PVA)/Glycerol is used. The binder is formulated according to a ratio of PVA/Glycerol needed to avoid "depletion flocculation" or gelation which frequently occurs during the binder mixing in preparation of the ceramic slurry.

The "depletion flocculation" or gelation during the binder mixing is also minimized by adjusting the amount of citric acid and the pH value of the binder. In the binder formulation, other additives such as a surfactant (420 Surfactant, Air Products, Allentown, Pa.) and a defoamer (DF-75, Air Products, Allentown, Pa.) are also added. These additives reduce the slurry surface tension and the stability of bubbles for the purposes of defoaming and preventing tape separating during the casting.

A PVA/Glycerol binder system is used because it has been found to contain very low levels of sulfur. Sulfur is highly restricted in the carbonate fuel cell because it not only enhances the corrosion of the components but also causes the poisoning of the anode and the reforming catalyst. Although acrylic binders have shown better polymer burnout behavior than that of PVA, water based acrylic binders usually contain high levels of sulfur and cannot be used in the carbonate fuel cell.

The slurry formation step is followed by a degassing step 13 in which excess gases are removed from the slurry. In particular, entrapped air bubbles are allowed to escape or are removed by gentle mixing. This may be aided by providing a mild vacuum atmosphere. This step is then followed by a tape casting step 14 performed in a usual manner to result in a completed $\alpha$-$LiAlO_2$ matrix.

EXAMPLES

Examples of compositions of ceramic matrices formed using the method of the invention are depicted in FIGS. 2 and 3. An illustrative example of the practice of the method of the invention to realize these matrices is described below.

The ceramic powder used in this example was $\alpha$-$LiAlO_2$ (Cyprus Foote Mineral Company, Kings Mountain, N.C.) having a surface area of 11.3 $m^2$/g. X-ray diffraction analysis showed a negligible amount of gamma lithium aluminate (0.4 wt. %) in the as-received powder. An aqueous solution for the deflocculation step was prepared using citric acid (reagent grade, Aldrich, Milwaukee, Wis.) and distilled ("DI") water at a ratio of ~1/20 to 1/15. The solution was stirred for 0.5 hour before adding the $LiAlO_2$ ceramic powder.

The amount of the ceramic powder was controlled so that the ratio of citric acid/ceramic powder remained at a ratio of 1/20 to 1/10. The deflocculation was carried out in a laboratory batch attritor which was equipped with a YTZ agitation shaft, a water-cooled alumina (99.8%) tank (1400 cc), and YTZ grinding balls (0.6 mm in diameter, 40 vol. % filled). The powder was gradually added into the aqueous solution and was attrition milled for 0.5 hour at 1000 RPM. After deflocculation, the aqueous mixture was separated from the grinding equipment and poured into a binder system to carry out the slurry formation step.

The binder system was prepared from a polyvinyl alcohol binder (AIRVOL PVA, Air Product, Allentown, Pa.) and a Glycerol plasticizer (reagent grade, Aldrich, Milwaukee, Wis.). Three different grades of PVA were used for the binder preparation, including: AIRVOL 203, AIRVOL 523 AND AIRVOL 502. AIRVOL 203 was mixed with either AIRVOL 523 or AIRVOL 502 in DI water at a temperature of 80° C. The weight ratio of AIRVOL 203/AIRVOL 502 or 523 was adjusted between 1 to 2, and the amount of PVA dissolved in the water was about 25 to 35 wt. %.

After dissolving the PVA, glycerol was added and mixed to form a uniform binder system. The ratio of glycerol to PVA binder was about 0.5 to 1. A small amount (0.5 to 1.5 gram per 100 gram binder mixture) of defoamer (Surfynol DF-75, Air Product, Allentown, Pa.) was also added into the binder mixture for the defoaming purpose.

Additionally, a surfactant (Surfynol 420, Air Product, Allentown, Pa.) may also be added to the binder system to modify the binder surface tension and prevent separation of the slurry during the tape casting (in case the surface tension of the carrier is lower than the binder). Finally, the pH value of the binder was adjusted to ~11.5 using 0.5% ammonium hydroxide before adding the deflocculated ceramic mixture.

The binder system and the deflocculated ceramic were stirred in a mixer at ~30 to 50 RPM for 5 to 10 hours to form a homogeneous slurry. The amount of the binder was between 10 to 15 wt. % of the total solid loading, and the viscosity of the final slurry was between 2000 to 5000 CPS (Centipoises). During the mixing, about 15 to 20 wt. % reinforcement material, such as, large alumina ($Al_2O_3$) particles or platelets in the size ranging from 20 to 100 $\mu$m, was also added as crack attenuators.

Tape casting of the slurry was conducted in a doctor blade caster using either silicon-coated polyester (PET, Maylar Grade D) or polymer coated paper (Ultracast patina PVC, S.D. Warren Co., Westbrook, Me.) dependent on the surface tension of the slurry. A tape having a thickness of between 0.006" to 0.015" was cast at ~10"/min and dried in the air for 12 hours. The dried tape was easily released from the carrier and showed homogeneous microstructure and thickness.

Figure 4:
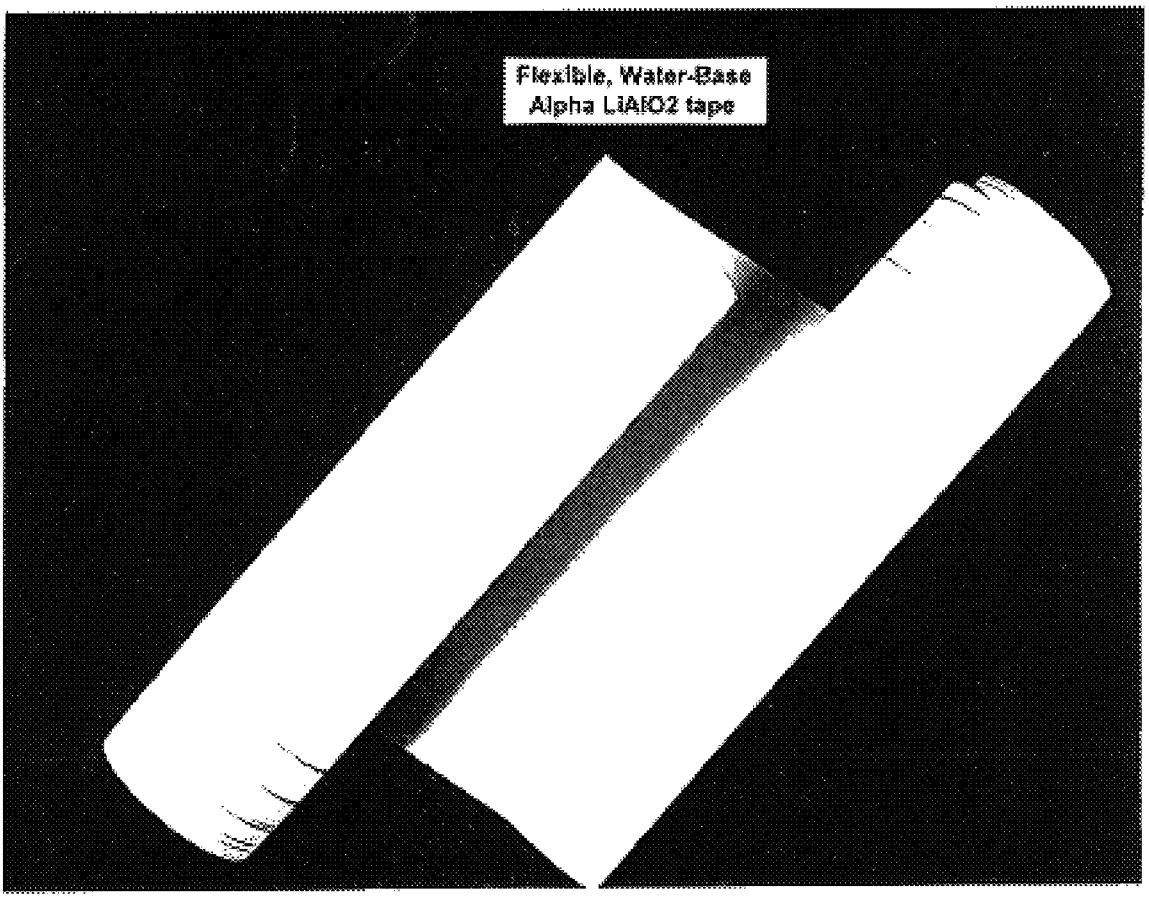
FIG. 4 shows sections of ceramic matrices formed by the method of FIG. 1.

Sections of a green matrix or tape cast from the slurry with the composition of Table 1 is shown in FIG. 4. The flexible tape showed desirable mechanical strength, lamination behavior as well as microstructure. The green tape was laminated at room-temperature using 2000 Psi pressure.

Figure 5:
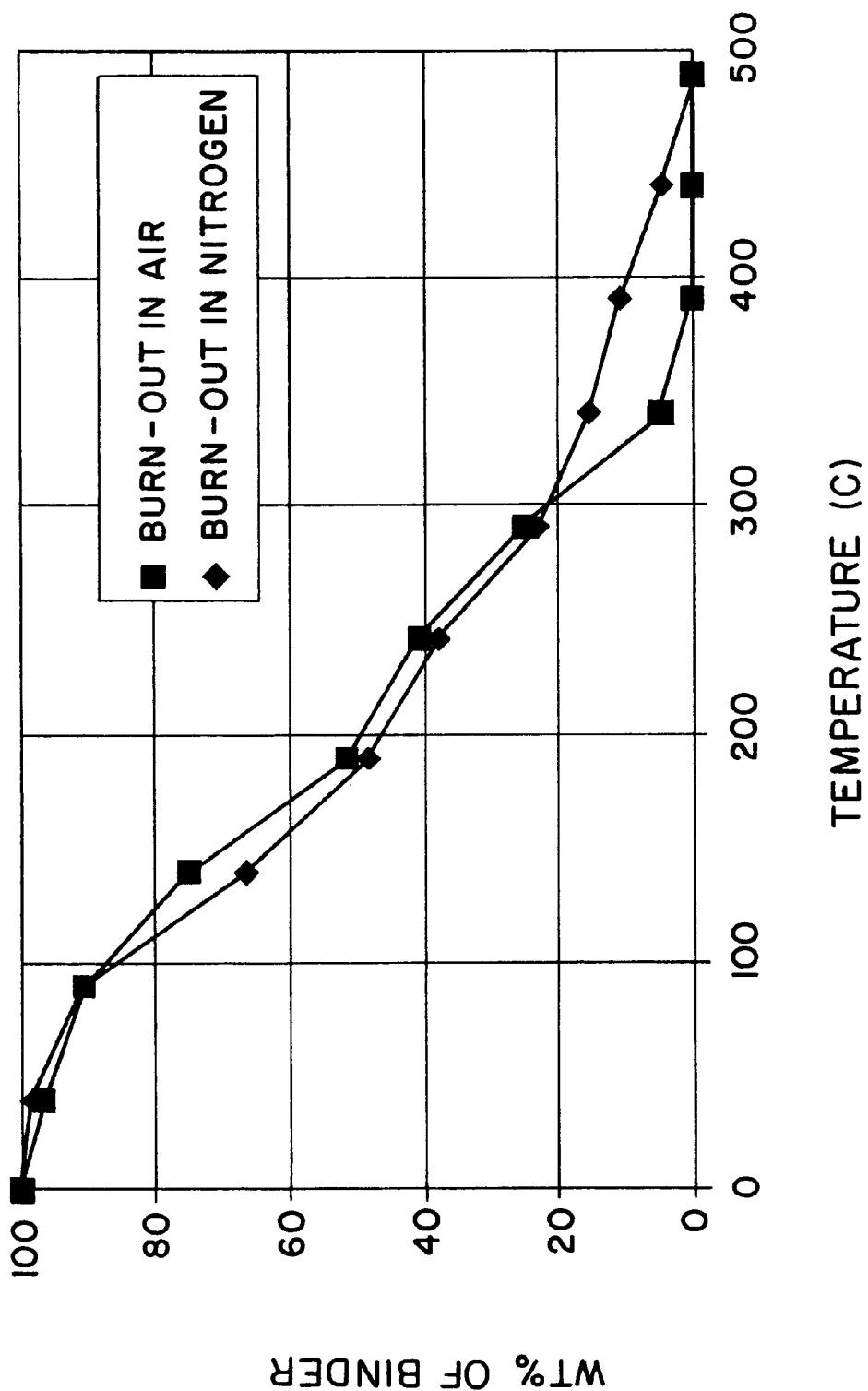
FIG. 5 shows a graph of binder burnout versus temperature for ceramic matrices made with the method of FIG. 1.

FIG. 5 shows a thermogravimetric analysis (TGA) for the binder removal from fabricated matrices or tapes in either an oxidizing or an inert atmosphere. As can be seen, the binder removal starts in either atmosphere by thermolysis at approximately 220° C., and continuously occurs indicated by continuous loss of weight, with a relatively sharp transition between 400° C. and 500° C. After binder removal, the fabricated matrices became brittle but retained structural integrity.

Figure 6:
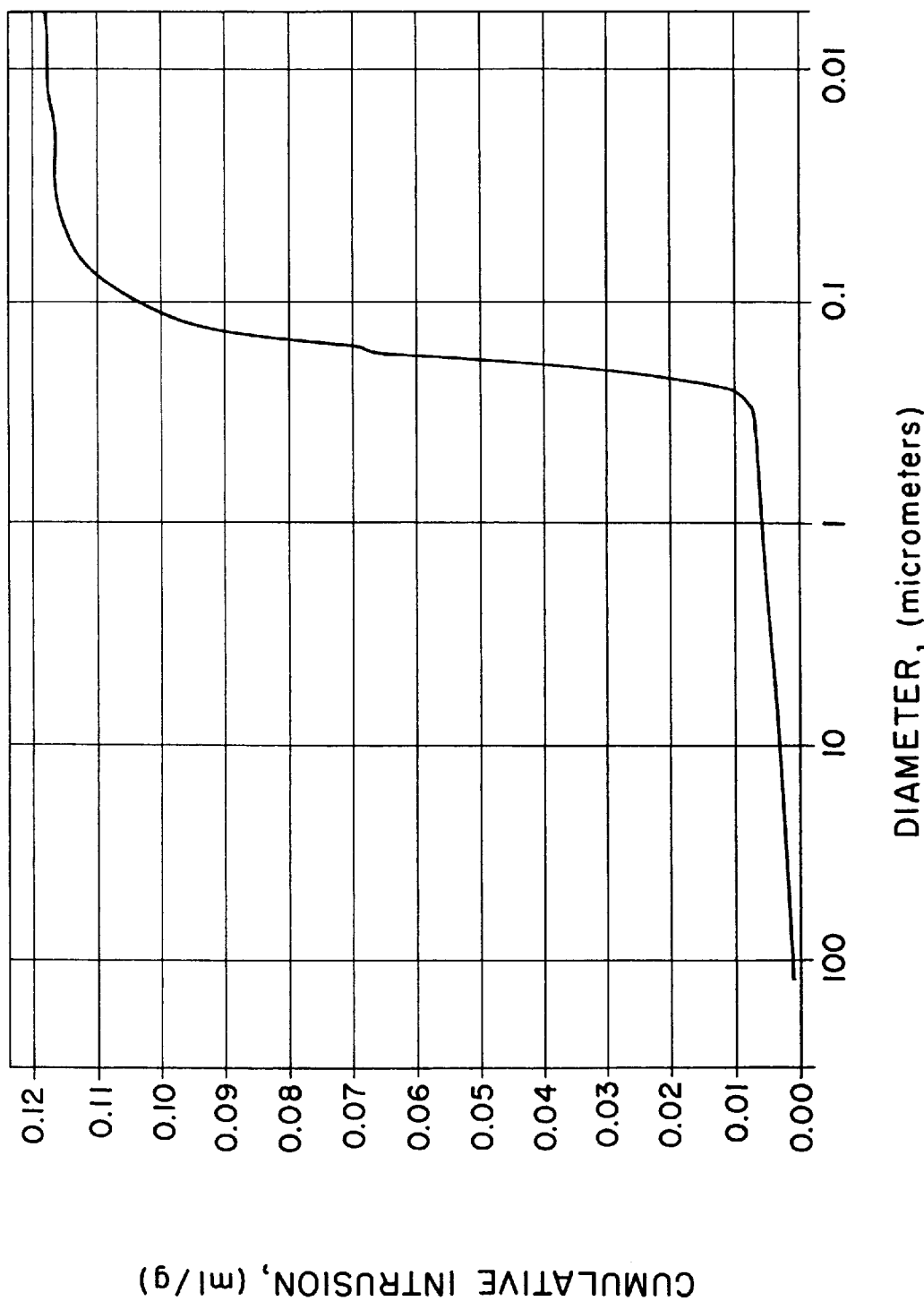
FIGS. 6 and 7 are graphs showing the porosity characteristics of ceramic matrices made with the method of FIG. 1.
Figure 7:
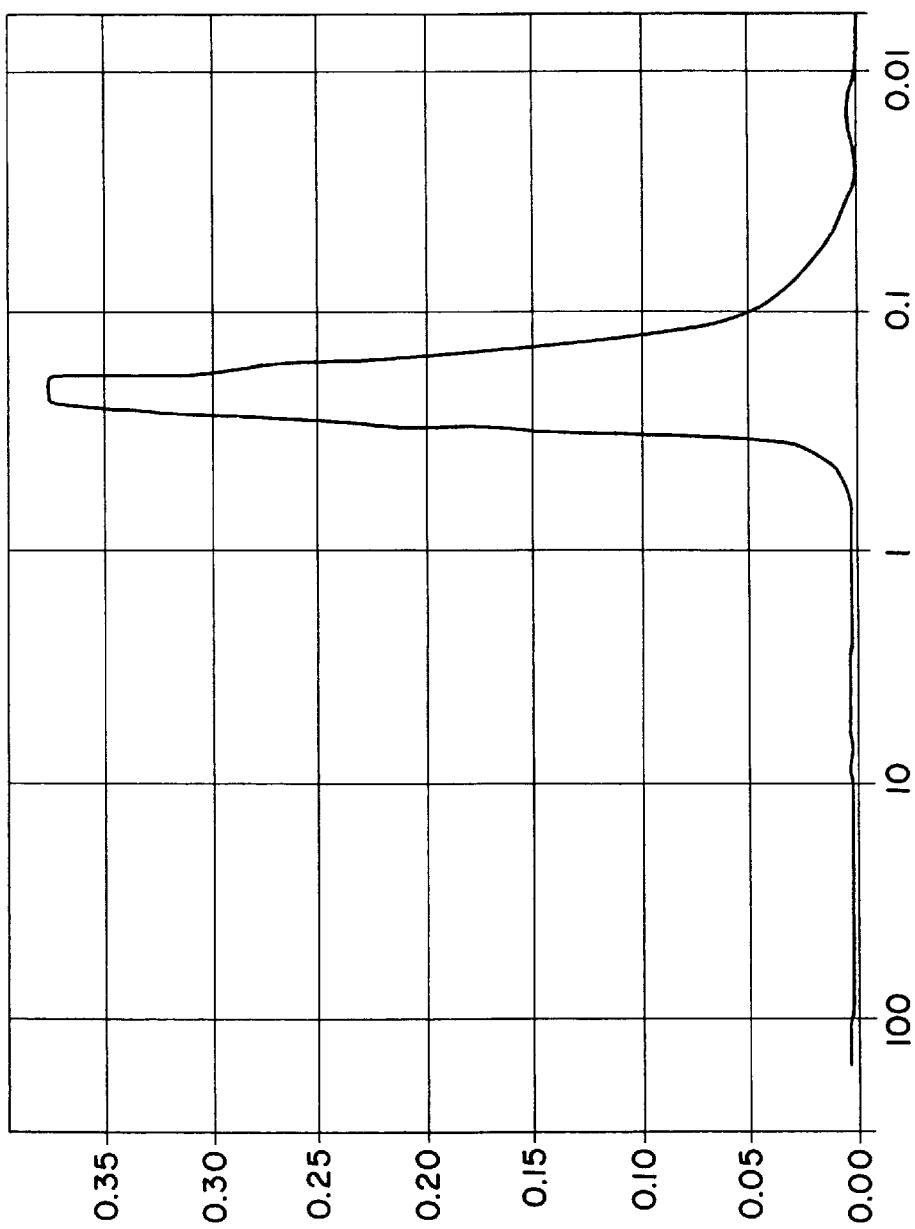

FIGS. 6 and 7 show a mercury porosimetry analysis of a fabricated matrix after the binder removal, indicating a small mean pore size of 0.2 $\mu$m diameter with a desired narrow, uniform pore size distribution of from about 0.02 to 0.8 $\mu$m diameter. Single cell testing of a fabricated matrix (Table 3 of FIG. 8) with the composition of Table 1 of FIG. 2 showed a good gas sealing efficiency, with undetectable reactant gas cross-over. A similar result was also obtained for the matrix prepared from the composition given in the Table 2 of FIG. 3.

It should be noted that, while the range of thicknesses and mean pore sizes for the matrices of the invention set forth above are preferred, wider ranges are also usable. In particular, thicknesses in the range of 0.004" to 0.050" and mean pore sizes in the range of 0.06 to 0.40 $\mu$m diameter are also usable.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A method of forming a matrix for a carbonate fuel cell comprising:

deflocculating a ceramic material comprising: combining said ceramic material with an aqueous solvent; high energy attrition milling said ceramic material in said aqueous solvent to deflocculate said ceramic material;

forming said deflocculated ceramic material in said mixture into a matrix; and wherein said ceramic material is $\alpha$-$LiAlO_2$.

2. A method in accordance with claim 1 wherein:

said deflocculating further comprises: adding a dispersant to said aqueous solvent.

3. A method in accordance with claim 2 wherein:

said dispersant is citric acid.

4. A method in accordance with claim 3 wherein:

the ratio of ceramic material to dispersant is in the range of 1/20 to 1/15.

5. A method in accordance with claim 2 wherein:

the ratio of ceramic material to dispersant is in the range of 1/20 to 1/15.

6. A method in accordance with claim 3 wherein:

said high energy attrition milling is carried out over a period of time of between 15 and 45 minutes.

7. A method in accordance with claim 6 wherein:

said high energy attrition milling is carried out for a period of time of 30 minutes.

8. A method in accordance with claim 6 wherein:

said high energy attrition milling is carried out using YTZ grinding balls of 0.3 to 0.6 mm in diameter and a milling speed of 1000 to 1500 rpm, with the solid material being milled being present in the amount of 40 to 60 volume percent.

9. A method in accordance with claim 8 wherein:

the volume of ceramic material in said mixture is between 40 to 60 volume percent.

10. A method in accordance with claim 8 wherein:

said forming step comprises: combining said attrition milled mixture with a binder system to form a slurry.

11. A method in accordance with claim 10 wherein:

said binder system is an aqueous binder system of an hydroxyl group polymer and a plasticizer.

12. A method in accordance with claim 11 wherein:

said hydroxyl group polymer is polyvinyl alcohol and said plasticizer is glycerol.

13. A method in accordance with claim 12 wherein:

the amount of polyvinyl alcohol to water in said aqueous binder system is 25 to 35 weight percent; and the ratio of glycerol to polyvinyl alcohol is 0.5 to 1.

14. A method in accordance with claim 13 wherein:

said binder system further comprises a defoamer and a surfactant.

15. A method in accordance with claim 14 wherein:

said binder system further comprises an hydroxide to adjust the pH of the binder system.

16. A method in accordance with claim 1 wherein:

said high energy attrition milling is carried out over a period of time of between 15 and 45 minutes.

17. A method in accordance with claim 16 wherein:

said high energy attrition milling is carried out for a period of time of 30 minutes.

18. A method in accordance with claim 16 wherein:

said high energy attrition milling is carried out using YTZ grinding balls of 0.3 to 0.6 mm in diameter and a milling speed of 1000 to 1500 rpm, with the solid material being present in the amount of 40 to 60 volume percent.

19. A method in accordance with claim 18 wherein:

the volume of ceramic material in said mixture is between 40 to 60 volume percent.

20. A method in accordance with claim 1 wherein:

said forming step comprises: combining said attrition milled mixture with a binder system to form a slurry.

21. A method in accordance with claim 20 wherein:

said binder system is an aqueous binder system of an hydroxyl group polymer and a plasticizer.

22. A method in accordance with claim 21 wherein:

said hydroxyl group polymer is polyvinyl alcohol and said plasticizer is glycerol.

23. A method in accordance with claim 22 wherein:

the amount of polyvinyl alcohol to water in said aqueous binder system was 25 to 35 weight percent; and the ratio of glycerol to polyvinyl alcohol was 0.5 to 1.

24. A method in accordance with claim 23 wherein:

said binder system further comprises a defoamer and a surfactant.

25. A method in accordance with claim 24 wherein:

said binder system further comprises an hydroxide to adjust the pH of the binder system.

26. A method in accordance with claim 1 wherein:

said forming comprises: combining said attrition milled mixture of ceramic material and aqueous solvent with a binder system to form a slurry; and casting said slurry to form said matrix.

27. A method in accordance with claim 26 wherein:

said matrix has a mean pore size of 0.06 to 0.4 $\mu$m diameter.

28. A method in accordance with claim 27 wherein:

said matrix has a pore size distribution of 0.02 to 0.8 $\mu$m diameter.

29. A method in accordance with claim 28 wherein:

said matrix has a mean pore size of 0.2 $\mu$m diameter.

30. A method in accordance with claim 28 wherein:

said matrix has thickness in a range of 0.004 to 0.050 inches.

31. A method in accordance with claim 30 wherein:

said matrix has a thickness in a range of 0.006 to 0.015 inches.

32. A method in accordance with claim 26 wherein:

said deflocculating further comprises: combining a dispersant with said aqueous solvent; and said binder system is an aqueous binder system of an hydroxyl group polymer and a plasticizer.

33. A method in accordance with claim 32 wherein:

said high energy attrition milling is carried out using YTZ grinding balls of 0.3 to 0.6 mm diameter and a milling speed of 1000 to 1500 rpm, with the solid material being milled being present in an amount of 40 to 60 volume percent; and said hydroxyl group polymer is polyvinyl alcohol and said plasticizer is glycerol.

34. A method in accordance with claim 26 wherein:

said combining step includes mixing said binder and attrition milled mixture.

35. A method in accordance with claim 34 wherein said mixing of said binder and attrition milled mixture is carried out in a mixer running at a speed of 30 to 50 PPM for a period of 5 to 10 hours.

36. A method in accordance with claim 34 wherein said slurry has a viscosity of 2000 to 5000 CPS.

37. A method in accordance with claim 34 wherein:

said binder is in a range of 10 to 15 wt. % of the solid loading of said slurry.

38. A method in accordance with claim 26 further comprising:

combining crack attenuator material with said attrition milled mixture and said binder system.

39. A method in accordance with claim 38 wherein:

said crack attenuator material is 15 to 20 wt. % of the solid content of said slurry.

40. A method in accordance with claim 38 wherein:

said crack attenuator material is in the form of one or more of particles and platelets.

41. A method in accordance with claim 40 wherein:

said one or more of said particles and platelets are of a size of 20 to 100 $\mu$m.

42. A method in accordance with claim 41 wherein:

said crack attenuator material comprises alumina.

43. A method in accordance with claim 38 wherein:

said crack attenuator material comprises alumina.

* * * * *

UNITED STATES PATENT AND TRADEMARK OFFICE
CERTIFICATE OF CORRECTION

PATENT NO. : 5,997,794
DATED : December 7, 1999
INVENTOR(S) : Chao M. Huang, et al.

It is certified that error appears in the above-identified patent and that said Letters Patent are hereby corrected as shown below:

Col. 1, line 31, delete "0.24" and insert --0.2--.
Col. 1, line 33, delete "3235240" and insert --2325240--.

Signed and Sealed this

Seventeenth Day of April, 2001

*Attest:*

NICHOLAS P. GODICI

*Attesting Officer*     *Acting Director of the United States Patent and Trademark Office*